United States Patent
Miller et al.

(10) Patent No.: US 11,113,115 B2
(45) Date of Patent: Sep. 7, 2021

(54) DYNAMIC RESOURCE OPTIMIZATION

(71) Applicant: ADVA Optical Networking SE, Meiningen-Dreißigacker (DE)

(72) Inventors: Ian David Miller, Raleigh, NC (US); Robert LeRoy Lynch, Raleigh, NC (US); Timothy J. Shearer, Chapel Hill, NC (US)

(73) Assignee: ADVA Optical Networking SE, Meiningen-Dreißigacker (DE)

( * ) Notice: Subject to any disclaimer, the term of this patent is extended or adjusted under 35 U.S.C. 154(b) by 142 days.

(21) Appl. No.: 16/553,215

(22) Filed: Aug. 28, 2019

(65) Prior Publication Data

US 2021/0064429 A1    Mar. 4, 2021

(51) Int. Cl.
*G06F 9/50* (2006.01)
*H04L 12/911* (2013.01)

(52) U.S. Cl.
CPC ............ *G06F 9/505* (2013.01); *G06F 9/5077* (2013.01); *G06F 2209/501* (2013.01); *H04L 47/70* (2013.01)

(58) Field of Classification Search
CPC .. G06F 9/505; G06F 9/5077; G06F 2209/501; H04L 47/70
See application file for complete search history.

(56) References Cited

U.S. PATENT DOCUMENTS 5,996,013 A * 11/1999 Delp ..................... G06F 9/5027
                                                        370/232
7,584,281 B2    9/2009 Bernardin et al.
(Continued)

FOREIGN PATENT DOCUMENTS

| CN | 101938416 B | 1/2011 |
|----|-------------|--------|
| CN | 103220337 B | 10/2015 |
| WO | 2011/088224 A2 | 7/2011 |

OTHER PUBLICATIONS

Mihail, Alecu, European Search Report on application No. 20193219. 1-1203 / 3786796 (the EPO counterpart application to the present application), dated Jan. 25, 2021, 10 pages, European Patent Office, Munich, Germany.
Navrátil, Milan, Chapter 3. Tuned & Chapter 4. Tuna from Red Hat Enterprise Linux 7—Performance Tuning Guide, 26 pages, Copyright 2018, Red Hat, Inc., Raleigh, North Carolina, United States of America.

(Continued)

*Primary Examiner* — Jacob D Dascomb
(74) *Attorney, Agent, or Firm* — Kevin E Flynn; Flynn IP Law

(57) ABSTRACT

Dynamically allocating workloads to a fixed number of CPU resources within a compute platform. Determining whether a workload should be in a Dedicated Class of workloads and assigned to a dedicated CPU resource or in a Shared Class of workloads that is handled by a set of at least one shared CPU resource, wherein a shared CPU resource may service more than one workload. The determination may be made based on a comparison of a parameter from two samples of a parameter taken at different times. The determination may be made using metadata associated with the workload. The determination may be made repeatedly so that some workloads may change from being in the Dedicated Class to the Shared Class or from the Shared Class to the Dedicated Class. High availability virtual network functions may be handled economically by deeming the failover workloads to be in the Shared Class.

22 Claims, 7 Drawing Sheets

(56) References Cited

U.S. PATENT DOCUMENTS

| | | | |
|---|---|---|---|
| 7,870,568 B2 | 1/2011 | Bernardin et al. | |
| 9,396,009 B2* | 7/2016 | Biran | H04L 47/822 |
| 9,760,395 B2* | 9/2017 | Doherty | G06F 11/30 |
| 2006/0277307 A1 | 12/2006 | Bernardin | |
| 2014/0007098 A1* | 1/2014 | Stillwell, Jr. | G06F 9/45533 718/1 |
| 2019/0075062 A1 | 3/2019 | Brookshire et al. | |

OTHER PUBLICATIONS

Numactl—Control NUMA policy for processes or shared memory, 4 pages, archived Jul. 11, 2017, at https://web.archive.org/web/20170711101805/https://linux.die.net/man/8/numactl, die.net.

Corbet, Jonathan, (Nearly) full tickless operation in 3.10, 9 pages, May 8, 2013, https://wn.net/Articles/549580/, LWN.net, Eklektix, Inc., Boulder, Colorado, United States of America.

How to configure CPU pinning without use of 'isolcpus' kernel cmdline parameter in Red Hat OpenStack Platform, RedHat Customer Portal, Updated Oct. 4, 2018, 2 pages as printed, https://access.redhat.com/solutions/2884991, RedHat, Raleigh, North Carolina, United States of America.

What's "broken" about cpuset cgroup inheritance semantics in the Linux kernel?, Unix & Linux Questions, Asked Sep. 1, 2018 with subsequent edits and answers, 10 pages as pasted, https://unix.stackexchange.com/questions/466166/whats-broken-about-cpuset-cgroup-inheritance-semantics-in-the-linux-kernel, Stack Exchange Network, New York City, New York, United States of America.

8. How to get best performance with NICs on Intel platforms, A section within Getting Started Guide for Linux, Archived Jun. 29, 2018 5 pages, • DPDK Getting Started Guide/best practices , No author listed, DPDK Project, LF Prjects, LLC, Dover, Delaware, United States of America.

CPU topologies, Original post was not later than Aug. 27, 2019, 7 pages of screenshots, https://docs.openstack.org/nova/pike/admin/cpu-topologies.html#top, OpenStack Foundation, Austin Texas, United States of America.

CFS Scheduler, Original post was not later than Aug. 27, 2019, 5 pages, https://www.kernel.org/doc/html/latest/scheduler/sched-design-CFS.html, Linux Kernel Organization, San Jose, California, United States of America.

Scheduler Statistics, Original post was not later than Aug. 27, 2019, 4 pages, https://www.kernel.org/doc/html/latest/scheduler/sched-stats.html, Linux Kernel Organization, San Jose, California, United States of America.

Menage, Paul, Cgroups, 2004, 10 pages, https://www.kernel.org/doc/Documentation/cgroup-v1/cgroups.txt, Linux Kernel Organization, San Jose, California, United States of America.

Derr, Simon, Cpusets, 2004, 13 pages, https://www.kernel.org/doc/Documentation/cgroup-v1/cpusets.txt, Linux Kernel Organization, San Jose, California, United States of America.

The kernel's command-line parameters, Original post was not later than Aug. 27, 2019, 4 pages, https://www.kernel.org/doc/html/v4.14/_sources/admin-guide/kernel-parameters.rst.txt, Linux Kernel Organization, San Jose, California, United States of America.

Klech, Jaroslav et al., Section 3.13 Isolating CPUs Using Tuned-Profiles-Realtime, within Red Hat Enterprise Linus for Real Time 7—Tuning Guide, 10 pages, May 24, 2019, Red Hat, Inc., Raleigh, North Carolina, United States of America.

* cited by examiner

FIG. 6A                                                         1000

| 1004 | obtaining a first data sample at a first time for a first parameter for a set of workloads running within the compute platform; |

| 1008 | obtaining a second data sample at a second time, later than the first time, for the first parameter for the set of workloads; |

| 1012 | comparing for each workload within the set of workloads, a value for the first parameter taken at the second time and a value for the first parameter taken at the first time; |

| 1016 | based upon a comparison of the value for the first parameter taken at the second time and the value for the first parameter taken at the first time setting a determination for each workload within the set of workloads whether the workload should be<br>•    in a Dedicated Class of workloads and assigned to a dedicated CPU resource or<br>•    in a Shared Class of workloads that is handled by a set of at least one shared CPU resource, wherein a shared CPU resource may service more than one workload; |

| 1020 | based upon the determination for each workload within the set of workloads, mapping each workload within the Dedicated Class of workloads to have exclusive use of a Dedicated CPU resource and mapping each workload in the shared class of workloads to be handled by the set of at least one shared CPU resource; |

DYNAMIC RESOURCE OPTIMIZATION

BACKGROUND

Field of the Disclosure

This disclosure relates generally to the optimization of resources in a cloud computing environment. In particular, this disclosure is related to cloud deployments at the edge of the network, where all resources are expensive and limited.

Cloud technologies are an important part of modern communications, entertainment and application hosting. Today, most of the required compute resources are located in large and centralized data centers. However, the cloud landscape is changing. New drivers such as network functions virtualization (NFV), multi-access edge computing (MEC) and the internet of things (IoT) are driving compute resources away from data centers and into the access network and out to edge sites such as central offices, cell towers and customer locations. As a result, operators of edge applications are looking for smaller and more cost-effective compute resources. These smaller compute platforms introduce different requirements from those in the data center.

The first difference is that the cost of a server must be lower than in a data center. This lower cost is required to ensure that the budget and business case are satisfied. The lower cost means that server compute resources (CPU cores, memory and storage) are correspondingly smaller. As a result, there is a premium on efficient use of resources.

The next difference is that the edge-located server must host a variety of workloads which include both high-performance Virtual Network Functions (VNF) as well as management/operating system workloads. An additional challenge is that the workloads to be serviced may not be known ahead of time. This challenge is offset by a system that can dynamically adjust to unanticipated workload patterns. A VNF is a software implementation of a network function that can be deployed on a Network Function Virtualization (NFV) infrastructure.

One of the challenges is that the types of workloads to be handled and the relative proportion of one type of workload versus another type of workload is usually not known in advance and may vary over time. The management workloads may introduce periods of heavy load during startup, system configuration, and periodic maintenance, but are generally low impact, non-critical services. The VNFs, however, typically contain workloads which are high CPU use, latency sensitive services which require dedicated resources to achieve desired real-time performance, such as time-critical and lossless network packet processing.

Related Art

Cloud in a box provides an efficient and scalable deployment of cloud infrastructure. Prior implementations of cloud in a box allocated the management and non-time-critical workloads to a fixed subset of hardware resources. One such technique for accomplishing this is to use the Linux "isolcpus" command line configuration to exclude a subset of CPUs from the general kernel SMP (Synchronous Multi-processing) and scheduler algorithms, thus reserving those reserved CPUs for time-critical processes. This isolcpus technique works as long as the remaining non-reserved CPUs provide sufficient processing headroom to properly execute the maximum dynamic workload of management and non-time-critical workloads. As management and non-time-critical workloads expand and implement an increasing number of features, the constraints imposed by the limited set of non-reserved CPUs leads to either:

1) degraded system manageability and poor user experience or;
2) limits on the ability to instantiate VNFs or limits on the performance of the instantiated VNFs.

Prior implementations employ Dynamic Workload Allocation (see commonly assigned U.S. patent application Ser. No. 15/888,057 for Dynamic Workload Allocation filed Feb. 4, 2018). This prior solution taught the following:

maximize the resources available to payload workloads for economic reasons statically assign resources to payload workloads for performance reasons minimize the resources assigned to management functions ensure that the management functions are not starved.

Other Prior Art

OpenStack—OpenStack provides metadata annotations to virtual machines that identify how CPU cores should be allocated for the virtual machine (VM) when instantiated. Options include "dedicated" or "shared". These selections apply to all vCPU workloads (one workload in the host OS for each vCPU of the VM) and do not take into account the runtime behavior of workloads running on those vCPUs.

Linux Scheduling—The Linux scheduler is responsible for assigning CPU resources to computational workloads such as workloads, processes, or data flows.

While some scheduling algorithms can dynamically distribute workloads across all available CPU resources, this flexibility is likely to result in the scenario where low-latency workloads are preempted by other workloads that are scheduled on the same CPU. This preemption is known as a Context Switch. In the case of high-performance, packet-processing applications or VNFs, even the briefest interruption could result in a failure to de-queue packets from a Network Interface Card (NIC), potentially resulting in packet loss. Thus it is undesirable to subject a CPU handling low-latency workloads to context switching and the risk of packet loss.

tuned/tuna/numactl/taskset—These are all Linux utilities which in various ways tune the system for performance, set task/thread affinity, etc. These utilities are useful tools but they lack an analysis/identification phase, and are not continually running processes that monitor and adjust the system to react to changing loads.

OpenMP—There are some aspects of the OpenMP framework which allow a programmer to code into an application the knowledge of how the application demand for resources should be allocated among CPU cores. While useful for tweaking a well-understood and stable process, OpenMP relies on application specific knowledge that must be pre-programmed into the application for the purposes of optimizing how that application uses available system resources. The OpenMP framework applies only to the specific application and thus lacks the ability to analyze, detect, and adapt to varying workloads on the system which may be running several applications and the mix of application demands may vary over time.

Thus, there is an ongoing unmet need for a better way to simultaneously achieve the following:

maximize the resources available to productive workloads for economic reasons;

reserve resources for productive workloads for performance reasons;

minimize the resources assigned to management or non-time-critical workloads; and ensure that management or other non-time-critical workloads have sufficient resources to complete in a timely manner.

Note that in order to provide focus on specific functions, the description below will reference various "units". In this context, a unit implies the required resources to perform a given set of functions. This may include a combination of electro-mechanical devices such as a microphone or a camera and the processing power to control the devices then manipulate the data obtained by the devices. In some instances, the functionality from several individually discussed units may be performed using physical components that are shared by several of the units discussed below.

Vocabulary.

A workload may be defined as a set of instructions that need to be executed on a computer. Examples of workloads could include a Linux kernel task responsible for monitoring the temperature of a CPU, or an interrupt handler that reads an Ethernet frame from a network device, or a userspace thread. Those of skill in the art may tend to use thread when talking about certain workloads and use other terms when talking about other workloads. This disclosure will strive to use the term workload as much as possible rather than switching among various names used in different contexts. One application may have several workloads.

Time-critical workloads are workloads that need time-critical operation. They are responsible for completion of a task within a specified time constraint and require sufficient resources to do so within that time constraint. Many workloads are not time-critical as they do not need to respond to or complete a task within a specified time constraint. These workloads can be called non-time-critical.

Unless explicit to the contrary, the word "or" should be interpreted as an inclusive or rather than an exclusive or. Thus, the default meaning of or should be the same as the more awkward and/or.

Unless explicit to the contrary, the word "set" should be interpreted as a group of one or more items.

SUMMARY OF THE DISCLOSURE

Aspects of the teachings contained within this disclosure are addressed in the claims submitted with this application upon filing. Rather than adding redundant restatements of the contents of each of the claims, these claims should be considered incorporated by reference into this summary.

Some of the teachings of the present disclosure may be expressed as follows.

A method for dynamically allocating a fixed number of CPU resources within a compute platform. The method includes:

obtaining a first data sample at a first time for a first parameter for a set of workloads running within the compute platform;

obtaining a second data sample at a second time, later than the first time, for the first parameter for the set of workloads;

comparing for each workload within the set of workloads, a value for the first parameter taken at the second time and a value for the first parameter taken at the first time;

based upon the comparison of the value for the first parameter taken at the second time and the value for the first parameter taken at the first time setting, a determination for each workload within the set of workloads whether the workload should be:

in the Dedicated Class of workloads and assigned to a dedicated CPU resource; or in the Shared Class of workloads that is handled by a set of at least one shared CPU resource, wherein a shared CPU resource may service more than one workload; and mapping each workload within the Dedicated Class of workloads to have exclusive use of a Dedicated CPU resource and mapping each workload in the shared class of workloads to be handled by the set of at least one shared CPU resource;

The method includes:

obtaining a third data sample at a third time after the second time for a second parameter for the set of workloads running within the compute platform;

obtaining a fourth data sample at a fourth time, later than the third time, for the second parameter for the set of workloads;

comparing for each workload within the set of workloads, a value for the second parameter taken at the fourth time and a value for the second parameter taken at the third time;

based upon the comparison of the value for the first parameter taken at the second time and the value for the first parameter taken at the first time, setting a determination for each workload within the set of workloads setting a determination for each workload whether the workload should be in the Dedicated Class of workloads and assigned to a dedicated CPU resource; or in the Shared Class of workloads that is handled by a set of at least one shared CPU resource, wherein a shared CPU resource may service more than one workload; and based upon the determination for each workload within the set of workloads, mapping each workload within the Dedicated Class of workloads to have exclusive use of a Dedicated CPU resource and mapping each workload in the shared class of workloads to be handled by the set of at least one shared CPU resource Additional teachings of the present disclosure may be expressed as follows.

A method of deploying a set of at least one high availability virtual network function on a pair of servers. The method includes:

Obtaining a first server and a second server, each server having a set of CPU cores.

Assigning a set of CPU cores on the first server for use with a set of Dedicated Class workloads.

Assigning a set of at least one CPU core on the first server for use with a set of Shared Class workloads including at least one Shared Class workload for a non-time-critical workload.

Assigning a set of CPU cores on the second server for use with a set of Dedicated Class workloads.

Assigning a set of at least one CPU core on the second server for use with a set of Shared Class workloads including at least one Shared Class workload for a non-time-critical workload.

On the first server, assigning a set of at least two workloads for an active portion of a first high availability virtual network function to the set of Dedicated Class workloads and assigning each of the set of at least two workloads to a separate CPU core on the first server so that each of the set of at least two workloads for the active portion of the first high availability virtual network function is a sole workload on one of the separate CPU cores.

On the second server, assigning a set of at two workloads for failover for the first high availability virtual network function to a set of Shared Class workloads and assigning all of the set of Shared Class workloads to the set of at least one CPU core on the second server for use with a set of Shared Class workloads.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provided below as one of skill in the art will recognize that inventive concepts illustrated in various examples can be combined together in order to address a specific application.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The disclosure describes how to dynamically analyze the current workload on a system to identify critical workloads (e.g. threads or tasks) in order to optimally allocate dedicated CPU resources to those critical workloads in order to realize high performance networking while simultaneously ensuring sufficient CPU resources for management/overhead functions all while minimizing the cost of the platform. This work is done by the Dynamic Resource Optimization (DRO) engine as described in detail below.

One of the innovations of the present disclosure is the recognition of critical workloads by their signature and then dynamically allocating the CPU resources in the system accordingly. As noted above, prior art approaches have relied on a-priori estimates of the nature and types of workloads which will be run on the system in order to make static allocations of the CPU resources.

Unfortunately, relying on static pre-defined core allocations results in sub-optimal use of CPU cores within the system by either:
  reserving too many cores for VNFs or
  causing critical workloads to potentially share CPUs by allowing multiple VNFs to share CPUs.

Figure 3:
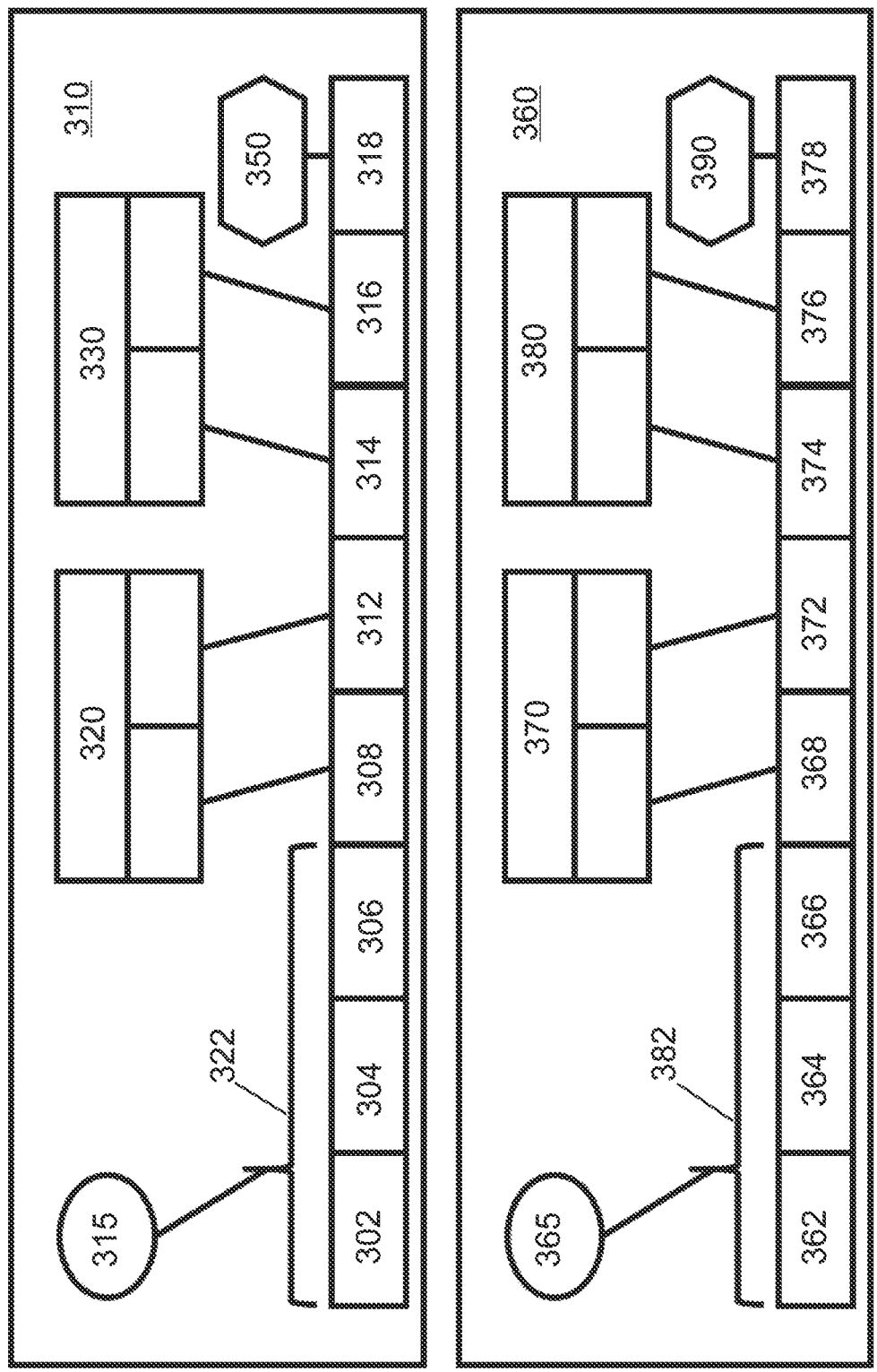
FIG. 3 shows a high availability deployment on two servers as done in the prior art without DRO.

The inefficiency of the prior art in CPU resource allocation results in high deployment cost (larger servers with more CPUs than necessary), reduced VNF capacity, and/or packet loss through a VNF. The inefficiency is especially noticeable in a High Availability (HA) deployment where half of the VNFs are not handling any end customer network traffic due to being in standby mode as shown in FIG. 3.

The present disclosure addresses this intersection of minimizing resources (CPU cores) for cost and dedicating resources (CPU cores) for high-performance VNFs by providing an analysis based dynamic allocation and tuning of CPU cores allocation to workloads.

On a given system, the number of CPU cores is a fixed value. These cores will be allocated to one of three classes of workload:
  Shared Class—typically consisting of non-time-critical workloads. These would include management, control plane, and other overhead workloads and would include non-time-critical workloads from applications.
  Dedicated Class—typically consisting of time-critical workloads such as VNF or host vSwitch fast-path processing;
  Unused—Unallocated cores typically placed in an offline or low power state.

For clarification, a subset of the set of total workloads is identified as part of the Dedicated Class. The workloads in the Dedicated Class are allocated to dedicated (no other workloads) cores. The DRO engine may subsequently reassign a particular workload to change the workload's state from being in the Dedicated Class to being in the Shared Class. Once a workload is no longer in the Dedicated Class, then that workload's reservation of a dedicated core is released and that workload is moved to a core allocated to the Shared Class.

In systems with more CPU cores than are required for the Dedicated and Shared functions classes, the extra cores are allocated to the Unused Class. Cores in this class are tuned for low power consumption by setting their CPU governor to "powersave" or equivalent low-power mode (or the core is set to offline). See FIG. 1.

An advantage of this approach is that cores are optimally dynamically allocated based on the actual current workload on the system.

A CPU core's allocation to one of the classes set forth above is not fixed for all time, but rather is a dynamic allocation performed by the DRO engine which is determining the optimal allocation of workloads into function classes and the allocation of CPU cores to functions based on the current state of the system. It should be noted as well that within each of these classes there may be further division into sub-groupings to meet various performance criteria. An example would be that the Shared CPU cores may be divided into multiple, isolated groups, such that host OS management functions are assigned to one group while VNF management functions are assigned to another group.

Figure 2:
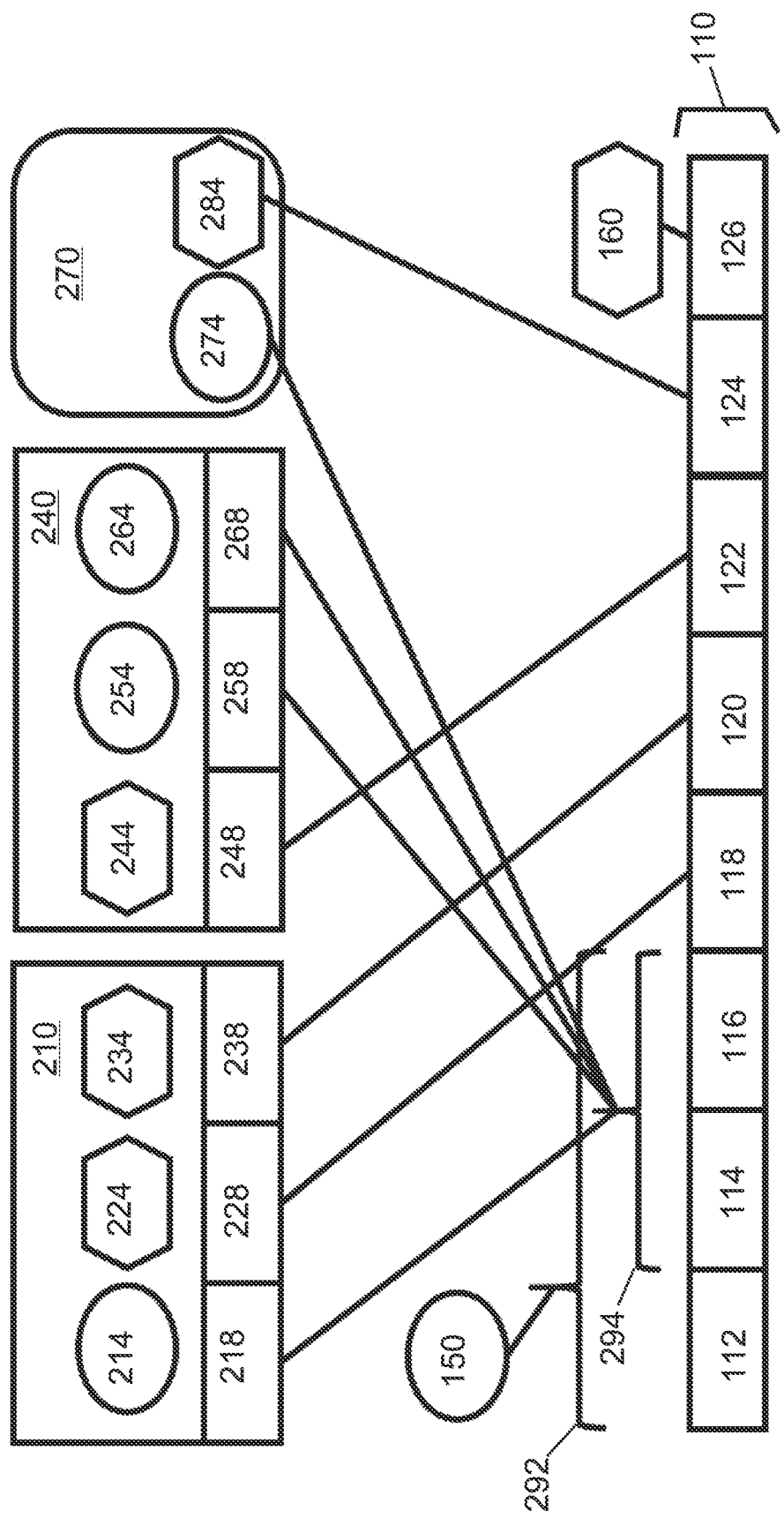
FIG. 2 shows allocation of cores to three VNFs in a DRO enabled system. DRO is able to identify the 5 fast-path workloads (4 from VNFs and one in the host OS) and allocates each of those to "Dedicated" cores. The remaining workloads are allocated to "Shared" class and assigned to the remaining 3 cores.

FIG. 2 shows Shared Class 292 having three cores and a Shared subclass 294 having access to two of those three cores. In this way the workloads assigned to each group have mitigated impact if the subclass shares some CPU cores with the workloads of another group, or have no impact if the subclass does not share cores with the workloads of another group, and system manageability can be maintained even if VNF management load is extremely high.

Similarly, each CPU core in the Dedicated Class is isolated from other cores in the Dedicated Class in order to achieve a 1 workload to 1 core dedicated mapping. The DRO maintains a list of all workloads and the class each workload is assigned to (Dedicated, Shared, and any subclasses within Shared if applicable). During the tuning and retuning, some workloads may be moved from Dedicated to Shared or from Shared to Dedicated. The movement from Dedicated to Shared may happen when the number of workloads deemed suitable to be in the Dedicated Class exceeds the available cores and the lowest priority workload is downgraded to Shared. It might also occur if reevaluation of the Dedicated Class workloads reveals that this workload no longer meets the requirements of a Dedicated Class workload.

Conversely, changes in CPU utilization for a particular workload that was originally placed into a Shared Class may cause that workload to be upgraded to Dedicated and allocated a dedicated CPU core.

The DRO engine operates in two phases. In the first phase ("analysis phase") all workloads running on the system are analyzed to identify the workloads which require allocation to a dedicated core. In the second phase, those workloads are allocated to CPU cores in the system, effectively moving those CPU cores into the Dedicated Class. The DRO engine may be configured to run periodic reevaluation of each Dedicated Class workload to determine if the workload needs to be moved back to the Shared Class or if a Shared Class workload needs to be moved to the Dedicated Class.

Analysis Phase.

The analysis phase consists of the DRO engine combining sampled attributes of each workload's behavior to determine if the workload matches the "signature" of one needing a dedicated core. The analysis phase may optionally include a review of one or more pieces of metadata for the workload. The DRO engine allows for multiple signature matching algorithms to be used during the analysis phase. Typically, a single signature matching algorithm is used at any one time but the user may want to pick one signature matching algorithm from a library of several different signature matching algorithms. An implementation may use one signature matching algorithm for deciding whether to promote a workload from shared to dedicated and use a different signature matching algorithm to decide whether to keep a workload as dedicated.

These signature matching algorithms may be provided in an extensible library and attached to the DRO engine through some configuration mechanism. Those of skill in the art will recognize that the algorithms may be provided using other conventional techniques, the result being multiple variants on how a workload is handled with respect to core allocation. For example, the results from the DRO engine may define the relative priority for allocating the set of workloads to dedicated cores. The DRO engine may define a relation of that workload to other workloads which should be allocated to certain core siblings. This list is non-exhaustive.

The DRO engine may be a perpetually running workload on the system. The DRO engine may continuously monitor all workloads in the system, characterizing all workloads by their signatures, and allocating or reallocating the workloads to appropriate classes. Those of skill in the art will recognize that alternatively, the DRO engine may be operated on a periodic interval. The DRO engine may be dormant after an initial use until a triggering event such as the addition or deletion of a workload causes the DRO engine to analyze all existing workloads and make appropriate allocation based upon the priority assigned to each workload.

One workload signature matching algorithm uses per-workload scheduling statistics available from the operating system kernel to identify critical workloads. On systems which provide these per-workload (e.g. thread) scheduling statistics, this signature matching algorithm can be the default workload signature matching algorithm used by the DRO engine. This signature matching algorithm may use a combination of execution time, time spent waiting to execute, and voluntary context switches to identify workloads which meet the signature of a typical packet-processing "fast-path" (e.g. poll-mode drivers), based on two criteria:

Requested CPU utilization approaching 100% over a non-trivial window of time (the window width considered non-trivial may be configured by the user); and Number of voluntary context switches is nearly zero over a non-trivial window of time.

On Linux systems supporting scheduling statistics via the /proc/[pid]/tasks/[tid]/schedstat file, the Requested CPU utilization for a given thread, as identified by unique values of [pid] (process id) and [tid] (thread id) and thus a unique instance of the schedstat file, may be determined through analysis of the contents of this file. The first field reported in this file is the actual scheduled execution time, in nanoseconds, for the workload on the CPU. The second field is the amount of time, in nanoseconds, of the workload spent waiting to run on the CPU. The sum of these two fields provides an approximation of the "Requested" CPU utilization which is used to determine if the first criterion is met. While it is possible that a workload with a mix of actual runtime plus waiting-to-run time which nears 100% of an interval when run on a shared core may consume significantly less than 100% of the dedicated core, those workloads will be identified and reallocated to the Shared Class on the next analysis pass. Optionally, the reallocation may include an annotation to prevent future allocation to the Dedicated Class.

Those of skill in the art will recognize that moving a workload from the Dedicated Class to the Shared Class and then back again over and over is possible for a workload that is a low-end candidate for the Dedicated Class. Once this particular workload is placed on a shared core with many other workloads, this particular workload tends to wait for the CPU thus biasing upward the Requested CPU utilization. Those of skill in the art may provide an annotation that makes this particular workload ineligible for movement back to Dedicated Class for some period of time after movement to Shared Class. This annotation may be combined with other techniques to phase out the annotation by progressively weakening the bias to keep this particular workload in the Shared Class. This phase out could be an exponential back off or some other tool known to those of skill in the art.

Those of skill in the art will recognize that other mechanisms may be used to obtain similar statistical data that could be used to perform the utilization analysis.

The context switching criteria are "typical" for packet-processing fast-path workloads because the goal of these workloads is to move packets through the system as quickly as possible. In order to do this with the minimum latency and zero packet loss, the fast-path workload uses every available CPU cycle to look for packets and move them along. In this vein, a context switch suspends the fast-path workload for a short period of time. During the time the fast-path workload is suspended, packets will likely arrive at a network interface and need to be serviced. As the fast-path workload is swapped out by the context switch, the incoming packets "sit" unhandled for until the fast-path workload is no longer suspended by the context switch.

If a sufficient number of packets arrive in that time window while the fast-path workload is suspended out by the context switch, then queues of recently arrived packets may overflow as the number of packets placed into the queue grows beyond the queue capacity. Any additional packets that arrive when the incoming packet queue is already full are lost in what is called an overflow. Minimizing the number of packets lost to overflow is important.

Ideally the losses due to overflow are zero packets.

Example 1—Analysis of Time-Critical Workload Currently on Shared Core Using Accumulated Execution Time and Context Switches For example, on a system running a VNF fast-path workload on a CPU core that is shared with other workloads, the DRO engine, using the workload signature matching algorithm, will read the following data samples, taken at a 10-second interval:
From /proc/[pid]/task/[tid]/schedstat:
Sample 1: 506337867077989 77487792605 589642
Sample 2: 506343439424637 81932293689 631037
From /proc/[pid]/task/[tid]/status (only showing the "ctxt" lines):
Sample 1:
voluntary_ctxt_switches: 637
nonvoluntary_ctxt_switches: 589015
Sample 2:
voluntary_ctxt_switches: 637
nonvoluntary_ctxt_switches: 630400

The difference between sample 1 and sample 2 of the first two fields gives the time the workload spent executing or waiting to execute during this sampled time interval in nanoseconds. In this example, the scheduled execution time of this workload is the difference between samples of the first field 506343439424637−506337867077989, or $5.572 \times 10^9$ ns whereas the waited-for-time is the difference between samples of the second field or 81932293689−77487792605, or $4.444 \times 10^9$ ns. The sum of these two fields is 10.016 seconds which, when accounting for sampling window error, indicates that during this 10-second sample window this workload had a "requested" utilization of 100% of a CPU. As noted above, requested CPU utilization is a combination of time using the CPU and the time waiting to use the CPU.

From the status data samples it is further determined that there were zero voluntary context switches as the running total of voluntary context switches in the second set of data is 637 which is unchanged from the first set of data.

CPU Utilization is 100%

Number of Context Switches is 0

Based on this analysis, the DRO engine adds this workload to the Dedicated Class so that the workload is given a dedicated CPU.

Example 2—Analysis of Non-Time-Critical Workload Currently on Shared Core Using Accumulated Execution Time and Context Switches Another workload on the system does not match the algorithm signature. In this case the /proc/[pid]/task/[tid]/schedstat data from two samples taken at a 10-second interval reads:
Sample 1: 59115210136019 9797827348391 28300936
Sample 2: 59115363994274 9797856084970 28301030

This sampling yields a CPU execution time of 59115363994274−59115210136019 which is $0.153 \times 10^9$ ns and a time spent waiting to execute of 9797856084970−9797827348391 which is $0.028 \times 10^9$ ns. As the sum of these two values is $0.181 \times 10^9$ ns which is significantly less than the 10-second sampling window the CPU utilization is less than 100%. This workload does not match the target signature for this algorithm and is thus allocated to the Shared Class. Even a total lack of voluntary context switching from sample to sample (not shown here) would not qualify this workload to be part of the Dedicated Class.

Example 3—Analysis of Time-Critical Workload on Dedicated Core

In this example, a fast-path workload which has already been allocated to the Dedicated Class and allocated a dedicated core is shown. With no contention for the CPU core the samples show that during the 10-second sampling window the entire time was spent in execution:
Sample 1: 508061269509567 3199775450984 13365387
Sample 2: 508071279347756 3199775450984 13365387
These data samples show 508071279347756−508061269509567 which is $10.009 \times 10^9$ ns time spent in execution and 3199775450984−3199775450984 which is 0 ns spent waiting. For context switches, the samples show:
Sample 1:
voluntary_ctxt_switches: 639
nonvoluntary_ctxt_switches: 13364747
Sample 2:
voluntary_ctxt_switches: 639
nonvoluntary_ctxt_switches: 13364747

With 0 context switches and 100% CPU utilization, this workload continues to match the signature algorithm and remains in the Dedicated Class.

Example 4—Analysis of Time-Critical Workload Currently on Shared Core Using Context Switches The workload signature matching algorithm used in the examples set forth above used a reliance on Requested CPU Core utilization (including time waiting for a CPU core) plus a secondary reliance on voluntary context switches. Other workload signature matching algorithms are possible. Not only possible but necessary for a system that does not provide the data to be used to calculate requested CPU usage. In this example, the workload signature matching algorithm uses context switch counts as the exclusive criteria.

On a system running a workload with real-time processing requirements, the workload signature matching algorithm would read sample the process's runtime statistics. The example below shows two such samples, taken from the Linux /proc pseudo-file system (/proc/[pid]/task/[tid]/status, where tid is the Task ID) at a 10-second interval:
Sample 1 (showing only the "ctxt" lines):
  voluntary_ctxt_switches: 55
  nonvoluntary_ctxt_switches: 4869
Sample 2 (showing only the "ctxt" lines):
  voluntary_ctxt_switches: 55
  nonvoluntary_ctxt_switches: 4976

By observing that the number of Voluntary Context Switches (voluntary_ctxt_switches) is not increasing, we have determined that the workload is not voluntarily sleeping, or waiting for some other operation to complete (for example, a file read or write operation), or performing any other system call that would cause the processor to switch execution to another workload on the same core. This allows us extrapolate that the workload is attempting to consume 100% of the available CPU cycles. This is the signature characteristic of a high-performance workload with real-time processing requirements. Thus, this workload would be placed in the Dedicated Class.

The "nonvoluntary_ctxt_switches" values are increasing over time, indicating that the operating system is forcibly scheduling work to be executed on the same CPU as this particular workload. The non-voluntary context switches result in this workload being interrupted from its normal operation. Excessive non-voluntary context switches increase the risk of data buffer overruns.

Example 5—Analysis of Non-Time-Critical Workload Currently on Shared Core Using Context Switches Using the same workload signature matching algorithm as in Example 4, here is an example of a workload with a different scheduling signature. As above, the focus is on voluntary and non-voluntary context switches derived from two /proc/[pid]/task/[tid]/status samples taken at a 10-second interval.
  Sample 1 (showing only the "ctxt" lines):
  voluntary_ctxt_switches: 11365
  nonvoluntary_ctxt_switches: 20
  Sample 2 (showing only the "ctxt" lines):
  voluntary_ctxt_switches: 11405
  nonvoluntary_ctxt_switches: 20

Compared with Example 4, in Example 5 we observe that the number of voluntary switches is increasing from one sample to the next sample taken 10 seconds later. The cause of this increase over time is that the operating system is "voluntarily" presenting the operating system with opportunities to schedule other workloads on this shared CPU core. This is not the signature behavior of a workload that requires a dedicated CPU. Note that the non-voluntary context switch count is not increasing. This is likely to be because the process was sleeping or waiting for a significant proportion of the measurement period, presenting the operating system with adequate opportunity to schedule other workloads without resorting to forcibly interrupting the process's execution. Thus, this workload would not be placed in the Dedicated Class.

Phase 2—Tuning.

Once a workload with real-time execution signature has been identified, the workload will be assigned to the "Dedicated" class. This causes the workload to be scheduled to execute on a CPU core that is isolated from all other workloads, perhaps by utilizing Linux cgroups and CPU sets. All hardware interrupts that were enabled on the dedicated core will be distributed to CPUs in the Shared Class. Those of skill in the art will understand that cgroups is not the only possible control mechanism as an equally effective tool for core allocation would be the "taskset" utility provided by Linux or other analogous tools.

Following placement in the Dedicated Class, workloads may continue to be periodically reevaluated to ensure they still qualify for the Dedicated Class.

During the allocation/tuning phase the DRO engine makes a determination as to how the critical workloads, identified in the analysis phase, are allocated to the cores in a system.

As part of this allocation, the DRO engine may reallocate some cores from Shared to Dedicated, or vice versa, in order to adjust to an imbalance between critical workloads and dedicated cores. However, in no case will the DRO allocate cores such that a class with assigned workloads has no cores on which to map them (see the oversubscription case below). The DRO core allocation algorithm operates such that, if there are workloads assigned to the Shared Class, there is a minimum threshold (typically 1, but configurably more) for the number of cores allocated to the Shared Class. The Dedicated Class does not need the same protection because cores are added to the Dedicated Class at the expense of the Shared Class as needed, thus ensuring that the Dedicated Class always has at least one core allocated to it if the Dedicated Class has assigned workloads.

The system is considered improperly configured if the minimum threshold for the Shared Class is equal to or greater than the number of cores in the system as that would not allow for any cores to be in the Dedicated Class. In a sufficiently resourced system, there are enough cores available such that each critical workload is allocated a dedicated core (a 1:1 mapping of workload to core) with sufficient cores remaining to support the management/overhead functions of the system. In this case, each critical workload is assigned to a CPU core and all other workloads in the system are excluded from running on that core.

There are multiple ways to achieve this exclusivity of one critical workload per core within Linux. One suitable approach to achieve this isolation is the use of cgroups (see //man7.org/linux/man-pages/man7/cgroups.7.html (http: omitted per MPEP convention)). Another suitable approach is to use the taskset utility to assign workloads to cores. When a critical workload is assigned to a dedicated core, that core is also "tuned" in various ways to ensure the workload gets 100% use of that core.

These tunings may include:
- Ensuring no other workloads are scheduled on that core (cgroup isolation)
- Ensuring that all non-essential IRQ handling is removed from that core (setting IRQ affinities)
- Setting the core's frequency governor to the highest performance mode (ensuring it does not go into any idle states)
- Ensuring that the core is "online" (if the core was previously in the Unused Class of cores)

In addition to tuning cores in the Dedicated Class, the DRO engine can tune cores and/or identified workloads that are allocated to the Shared Class as well. An example of this is given below in the High Availability use case description where standby fast-path workloads are given a decreased Linux scheduling priority and/or CPU quota.

As a part of the allocation process the DRO engine ensures that any workloads in the Dedicated Class which are already allocated to dedicated cores remain on the currently allocated core. In other words, a prohibition against context switching for this CPU core. This prohibition prevents interruptions to the process execution caused by context switches. As described elsewhere, it is possible for a workload to "leave" the Dedicated Class in which case that workload's hold on a dedicated core is released.

The DRO engine during the allocation and tuning phase is also able to more gracefully handle oversubscription. Oversubscription is the case where the number of workloads in the Dedicated Class (critical workloads as identified by algorithms including those using metadata) exceeds the number of cores available for use in the Dedicated Class. In the oversubscription case, the DRO engine uses the priority assigned to each of these workloads to allocate dedicated cores. Those workloads with the highest priority are assigned dedicated cores until all cores from the Dedicated Class have been allocated. The DRO engine then allocates the remainder of the workloads in the Dedicated Class to the Shared Class, or to cores used by the lowest priority workloads already allocated to cores in the Dedicated Class. The strategy selected depends on configurable settings provided to the DRO engine. In addition to allocating the workloads, the DRO engine will raise a notification to the operator of the oversubscription condition.

Other strategies that may be employed by the DRO engine for handling the oversubscription case include:
- Extending the metadata defined for workloads or VNFs to identify the acceptable sharing policy.
- Identifying, through knowledge of VNF networking and host virtual switch configuration, related fast-path (critical) workloads and causing these to share physical CPU cores.

Dynamic Operation of the DRO.

This portion of the disclosure illustrates how a DRO engine dynamically adapts to changes in the runtime behavior of a workload within the system. In this example, a VM based VNF has been instantiated on the system. There are two time frames of particular interest with respect to illustrating how the DRO analyzes the workloads and adapts the allocation of system resources.

Time T0.

The VNF is created at time T0, at which point multiple workloads are created in the system to support this VNF.

Time T1.

At time T1, the VNF created at time T0 has completed an internal boot-up sequence and sufficient configuration is applied such that the VNF allocates a fast-path workload to service packets according to its configuration. In the interval of T0 to T1, the typical 10-second snapshot of execution times of one workload of the VNF process would be:

(Actual CPU Utilization in nanoseconds, Waited-for Time in nanoseconds, third parameter not used by signature algorithm) Sample 1: 125834342 15796676 1802
Sample 2: 127577933 15915747 1831

During this time interval, based on the low actual CPU utilization (127577933−125834342 which is ~1.74 ms out of 10-second span) and waited-for (15915747−15796676 which is ~119 μs) CPU utilization, this workload does not meet the threshold for allocation to the Dedicated Class and is thus allocated to the Shared Class.

Following time T1, the typical 10-second snapshot of execution times of this same workload of the VNF process would be:

Sample1: 11692586257 17568898 2235
Sample2: 21699609605 17568898 2235

At this point in its execution, the workload now matches the signature with 21699609605−11692586257=10.007× $10^9$ ns which, when accounting for sampling error, is 100% of the CPU during this 10-second sampling window and the workload is allocated to the Dedicated Class.

Those of skill in the art will appreciate that the usage at some subsequent T2 could be the opposite so that a workload that was at one time deemed suitable for Dedicated Class may be reallocated to Shared Class as requested CPU utilization drops.

Depending on the specific VNF, particular use cases, and user interactions with the system, the time duration between T0 and T1 can vary from seconds to months or years. As the DRO is doing ongoing monitoring, once the change in signature happens, the workload can be reallocated from Shared Class to Dedicated Class.

Use of Metadata by the DRO.

For context, there are situations where reliance on data on CPU usage et cetera as set forth above will not lead to optimal allocation of CPU cores. The data may not be meaningful at startup because of transient conditions. In some situations a workload may stay busy and show high CPU usage but the task is not critical and the workload could be placed in the Shared Class without any negative impacts. Alternatively, a workload that is especially important to respond to in a time-critical manner when there is a problem may be placed in the dedicated status even though the workload may have low CPU utilization between incidents. As discussed below, the high availability workloads will have metadata that shows whether the workload is the active workload or the inactive workload that is ready to work should the CPU handling the active workload go down.

Thus, the DRO engine may be set to accept metadata via an API (programmatically at runtime or statically via configuration file) to further refine the analysis of each workload. This metadata may include:
- A Thread Identifier—This may be a "thread id" as used by Linux to identify a single workload, a "process id" as used by Linux to identify a process in which case the metadata applies to all workloads of the process, or a regular expression for identification of a workload by name.
- The desired target class to which the workload(s) should be allocated to—This may be the Dedicated Class or Shared Class.
- An optional priority for this allocation relative to other workloads in the target class.

The DRO engine uses the Thread Identifier to select one or more workloads operating on the system. These workloads are then explicitly allocated to the desired target class with the specified priority or with the lowest priority if none is given. The metadata may be used in a variety of use cases. A few illustrative examples are provided below.

Those of skill in the art will appreciate that as additional workloads are added or when workloads are deleted, it may be useful to re-evaluate the metadata for the revised set of workloads to make an allocation of some workloads to the Dedicated Class and some to the Shared Class. Alternatively, an assessment of metadata for all current workloads could be done periodically by the DRO engine.

The use of metadata may be done to augment/combine with other parameter-based analysis of a workload. Thus, for example, the metadata may bias the classification so that a lower threshold is needed on the parameter-based analysis in order to classify a workload as Dedicated Workload. Alternatively, the metadata may be used to override the parameter-based analysis of a workload by applying the metadata analysis after the parameter-based analysis and effectively ignoring the parameter-based analysis. Alternatively, the metadata may be used to bypass the parameter-based analysis of a workload by applying the metadata analysis before the parameter-based analysis and moving the workload out of the set of workloads that are classified using the parameter-based analysis.

Figure 6B:
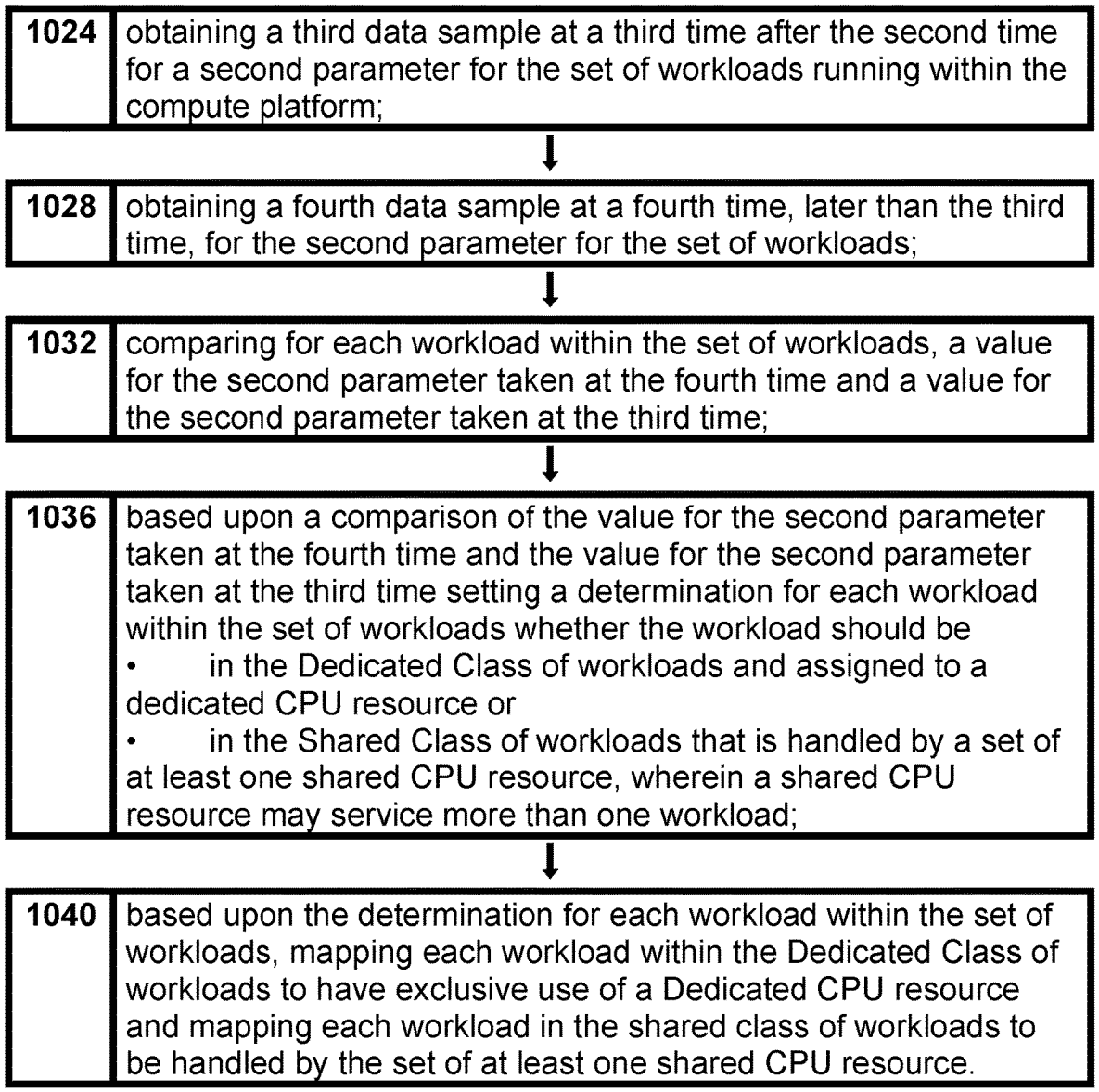
FIG. 6 sets forth process 1000 which is a generalization of a process for dynamic resource optimization.

FIG. 6 sets forth process 1000 which is a generalization of a process for dynamic resource optimization.

Step 1004—obtaining a first data sample at a first time for a first parameter for a set of workloads running within the compute platform.

Step 1008—obtaining a second data sample at a second time, later than the first time, for the first parameter for the set of workloads.

Step 1012—comparing for each workload within the set of workloads, a value for the first parameter taken at the second time and a value for the first parameter taken at the first time.

Step 1016—based upon a comparison of the value for the first parameter taken at the second time and the value for the first parameter taken at the first time setting a determination for each workload within the set of workloads whether the workload should be
  in a Dedicated Class of workloads and assigned to a dedicated CPU resource or
  in a Shared Class of workloads that is handled by a set of at least one shared CPU resource, wherein a shared CPU resource may service more than one workload.

Step 1020—based upon the determination for each workload within the set of workloads, mapping each workload within the Dedicated Class of workloads to have exclusive use of a Dedicated CPU resource and mapping each workload in the shared class of workloads to be handled by the set of at least one shared CPU resource.

Step 1024—obtaining a third data sample at a third time after the second time for a second parameter for the set of workloads running within the compute platform.

Step 1028—obtaining a fourth data sample at a fourth time, later than the third time, for the second parameter for the set of workloads.

Step 1032—comparing for each workload within the set of workloads, a value for the second parameter taken at the fourth time and a value for the second parameter taken at the third time.

Step 1036—based upon a comparison of the value for the second parameter taken at the fourth time and the value for the second parameter taken at the third time setting a determination for each workload within the set of workloads whether the workload should be
  in the Dedicated Class of workloads and assigned to a dedicated CPU resource or
  in the Shared Class of workloads that is handled by a set of at least one shared CPU resource, wherein a shared CPU resource may service more than one workload.

Step 1040—based upon the determination for each workload within the set of workloads, mapping each workload within the Dedicated Class of workloads to have exclusive use of a Dedicated CPU resource and mapping each workload in the shared class of workloads to be handled by the set of at least one shared CPU resource.

Those of skill in the art will recognize that various variations of this process may be made while retaining the characteristics of process 1000 but incorporating various teachings of this disclosure.

High Availability Failover.

Higher levels of software control may use the programmatic DRO metadata API to identify VNFs which are running in a "standby" state within a High Availability cluster. These VNFs are identified by Thread Identifier and allocated to the Shared Class. When a High Availability failover event occurs the software control plane removes this metadata to allow the primary workload algorithm to identify fast-path workloads by their signature. In this way the VNFs do not consume any dedicated resources until they are the active VNF being used to handle end-customer traffic.

Fast-Path Workloads.

The VNF infrastructure, running on the system, may use the DRO metadata API to identify fast-path workloads within the system that are used to support networking among physical interfaces (NICs), VNFs, and in support of system management functions. The metadata supplied to the DRO in this case is the specific Thread Identifier of the fast-path process, a target class of Dedicated, and a high priority. In this way the platform infrastructure is guaranteed placement on a dedicated core thus ensuring system manageability and inter-VNF networking even during resource constrained periods of operation.

Inheritance of VNF Parameters.

The VNF management software, such as OpenStack, may make use of the DRO metadata API to allocate the workloads supporting a VNF to the Dedicated Class based on parameters used during the definition of the VNF within that management plane.

Detailed Discussion of the Figures.

While it is often useful to start with a discussion as set forth above that provides a discussion of the forest before getting down into the details of the trees, this disclosure will now turn to a more detailed discussion of the individual figures.

FIG. 1.

Figure 1:
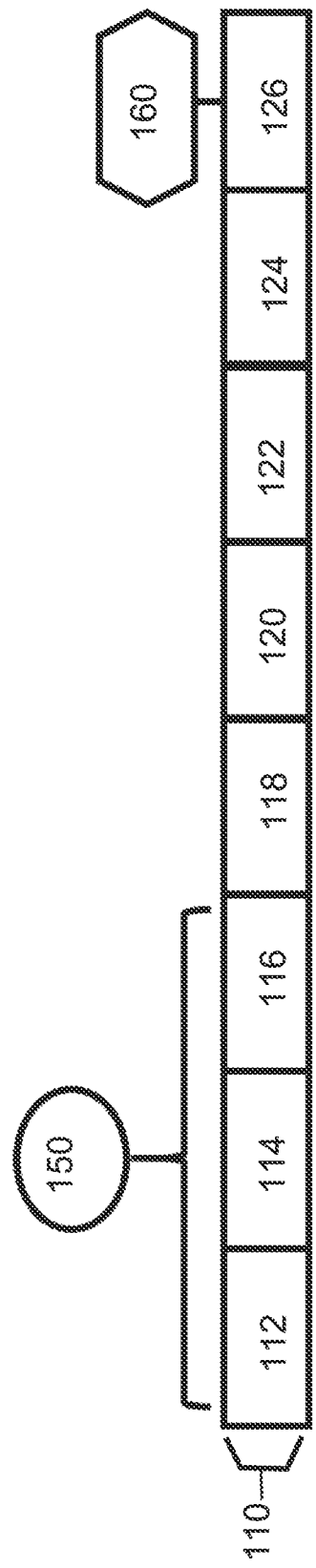
FIG. 1 shows the "baseline" Dynamic Resource Optimization (DRO) enabled system in which there are no VNFs running and DRO has allocated a single "Dedicated" core for the host vSwitch fast-path workload. DRO has allocated 3 cores to the "Shared" class to support management functions (host operating system, Network Function Virtualization infrastructure, and system management applications, or any other non-time-critical workloads) and put the remaining 4 cores into the Unused Class.

FIG. 1 illustrates at a high level, a system 100 which has a set 110 of CPU cores 112, 114, 116, 118, 120, 122, 124 and 126. Cores 112, 114, and 116 are allocated by the DRO to the Shared Class 292 (See FIG. 2) to support management functions for the Host Operating System workload 150. The DRO operates as part of the Host OS workload 150.

Core 126 has been allocated by the DRO, to host a vSwitch fast-path workload 160. One of skill in the art knows that the term vSwitch is a virtual switch. At this stage, there is not yet a VNF running. Thus, the remaining cores 118, 120, 122, and 124 are in the Unused Class and may be dropped into a low power standby state or moved to a lower power or offline state. Those of skill in the art will recognize that the precise low power or offline state that is available is a function of the particular hardware of the CPU core and beyond the focus of this disclosure.

FIG. 2.

FIG. 2 illustrates at a high level, the system 100 from FIG. 1 but at a later point in time. FIG. 1 shows a system that is sized for running one or more VNFs but none of the VNFs are yet defined or running. In contrast, FIG. 2 shows the same system after a number of VNFs have been defined or running. The evolution in status from FIG. 1 to FIG. 2 is a common condition when the system 100 is shipped/installed with some amount of future growth potential identified.

FIG. 2 still has the set 110 of CPU cores 112, 114, 116, 118, 120, 122, 124 and 126. The workload for host fast-path 160 is still on core 126.

The host OS workload 150 is still assigned to the Shared Class 292, and additionally the workloads for management functions of the VNFs are assigned to a subclass 294 of the Shared Class. If necessary the workload 150 from the Host OS may be handled by the cores 114 and 116 handling subclass 294 rather than solely on CPU core 112. However, the workloads from subclass 294 are not able to execute on core 112. Thus a heavy demand for resources in subclass 294 will not preclude workload 150 for host OS from using core 112.

A first VM VNF 210 has management workloads 214 on virtual CPU 218 (virtual CPU sometimes written as vCPU), a fast-path workload 224 on vCPU 228, and a second fast-path workload 234 on vCPU 238.

A second VM VNF 240 has a management workload 264 on virtual CPU 268, a second management workload 254 on vCPU 258, and a single fast-path workload 244 on vCPU 248.

A container VNF 270 has a management workload 274 and a fast-path workload 284.

The DRO allocates the vCPU 228 for fast-path workload 224, the vCPU 238 for fast-path workload 234, the vCPU 248 for fast-path workload 244 and the fast-path workload 284 from the container VNF 270 to four dedicated cores, 118, 120, 122, and 124. The non-fast-path management workloads are made Shared Class and placed into subclass 294 and the shared subclass 294 is allocated to CPU core 114 and CPU core 116. The non-fast-path management workloads are: management workload 214 on vCPU 218; workload 254 on vCPU 258; workload 264 on vCPU 268; and management workload 274 from container VNF 270.

One of skill in the art will appreciate that even though DRO does not have direct visibility of a fast-path workload 224 being allocated to run on VPU 228, DRO is able to classify the workload of vCPU 228 to be a Dedicated class thread by observing the behavior of the host OS workload which emulates vCPU 228 which reflects the fast-path behavior of workload 224.

DRO Used for High Availability VNF.

A specific, high value use of this approach is as applied to HA (High Availability) deployments in which VNFs are deployed in a redundant fashion with one instance actively participating in the revenue generating service chain and the mate VNF operating in a "standby" state waiting to take activity in the event of a critical fault on the active instance. Communications service providers require VNFs to be deployed in HA mode to meet the Five Nines (99.999%) reliability requirements for their service offerings. There is a design choice to either have sufficient resources to operate both active and standby instances of each VNF simultaneously or to allow the active and standby VNFs to share a more limited set of CPU resources. DRO allows the active and standby VNFs to share CPU resources while ensuring that the active VNF retains dedicated use of the CPU core and thus achieves maximum networking performance.

FIG. 3.

The overhead in deploying VNFs in HA mode doubles resource consumption compared to VNFs deployed in single instance standalone mode. FIG. 3 illustrates the prior art implementation of HA. A first server 310 with eight cores is supporting a first active VNF 320 with two dedicated cores (308 and 312). In order to meet the standard for HA, VNF 320 is duplicated on server 360 as standby VNF 370 with another two dedicated cores (368 and 372). Likewise, the first server 310 is supporting a second active VNF 330 with two dedicated cores (314 and 316). In order to meet the standard for HA, VNF 330 is duplicated on another eight-core server 360 as standby VNF 380 with another two dedicated cores (374 and 376).

A dedicated core 318 within server 310 is allocated for the host vSwitch fast-path 350 necessary to support the data traffic for active VNF 320 and active VNF 330. A dedicated core 378 within server 360 is allocated for the host vSwitch fast-path 390 necessary to support the data traffic for VNF 370 and VNF 380 which are currently inactive but would require a data path when activated.

Server 310 has three shared cores (302, 304, and 306) which handle Shared Class workloads such as the workload 315 for Operating System functions. Server 360 has three shared cores (362, 364, and 366) which handle Shared Class workloads such as the workload 365 for Operating System functions.

Thus, to support two active VNFs (320 and 330) in a Highly Available configuration, a total of 12 cores are needed. Two dedicated cores for each of the two active VNFs (308, 312, 314, and 316) and two dedicated cores to be in standby (368, 372, 374, and 376) for each of the two inactive VNFs. As the Shared Class could run on just one CPU core instead of three within servers 310 and 360, the total number of other CPU cores is 4 (two for the workloads for operating systems and two for the workloads for fast-path data).

Use of DRO to Reduce Cores Needed to Support HA.

Using the DRO engine, and applying standby status metadata to the workloads associated with the VNFs operating in "standby" mode, the DRO engine can avoid allocating those standby workloads to dedicated CPU resources. Instead the DRO engine allocates the standby workloads needed to support HA to the Shared Class, thus preserving a maximum number of cores for revenue generating critical workloads.

FIG. 4

Figure 4:
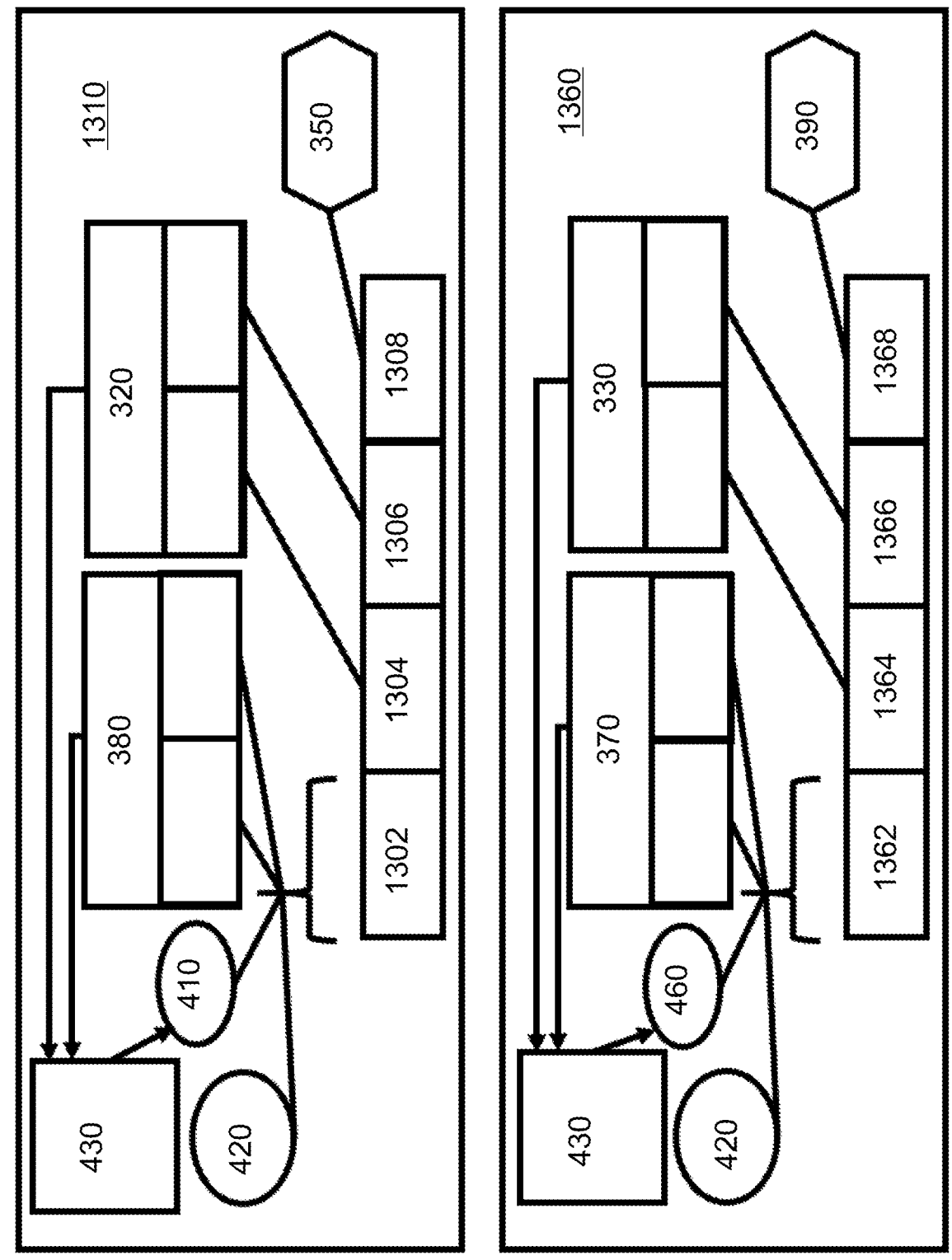
FIG. 4 shows a high availability deployment on two servers with DRO.

FIG. 4 shows the use of DRO in this HA use case. Server 1310 is now a less expensive four-core server instead of the eight-core server from FIG. 3. Server 1360 is now a less expensive four-core server instead of the eight-core server from FIG. 3. Each server (1310 and 1360) allocates a CPU core (1308 and 1368) for the workloads for the fast-path workloads (350 and 390).

Each server (1310 and 1360) will have two CPU cores dedicated to support an active VNF. For server 1310, the DRO engine 410 will assign two CPU cores (1304 and 1306) as dedicated to support the active VNF 320. A DRO engine 460 servicing server 1360 will likewise assign two CPU cores (1364 and 1366) as dedicated to support the active VNF 330. Note that each server (1310 and 1360) will have its own DRO engine (410 and 460) working in the OS workload 420 and will be serviced by the one or more shared CPU cores (1302 and 1362) that handle the OS workload for that server (1310, 1360). Each DRO engine 410 and 460 will have access to VNF metadata 430. The VNF metadata 430 may include: the VNF state (active versus standby) and the standby VNF policy (use of dedicated versus shared resources) via the metadata API for use in allocation of VNF workloads to Shared or Dedicated Class.

The DRO engine 410 will see from the VNF metadata 430 that two cores for inactive VNF 380 are requested for use as the standby cores for HA failover for VNF 330 which is active on Server 1360. The DRO engine 410 will not give these standby cores 380 dedicated cores, but will add these standby workloads to the workloads for the shared cores. In this example the Shared Class of workloads is handled on single CPU 1302.

FIG. 5.

Figure 5:
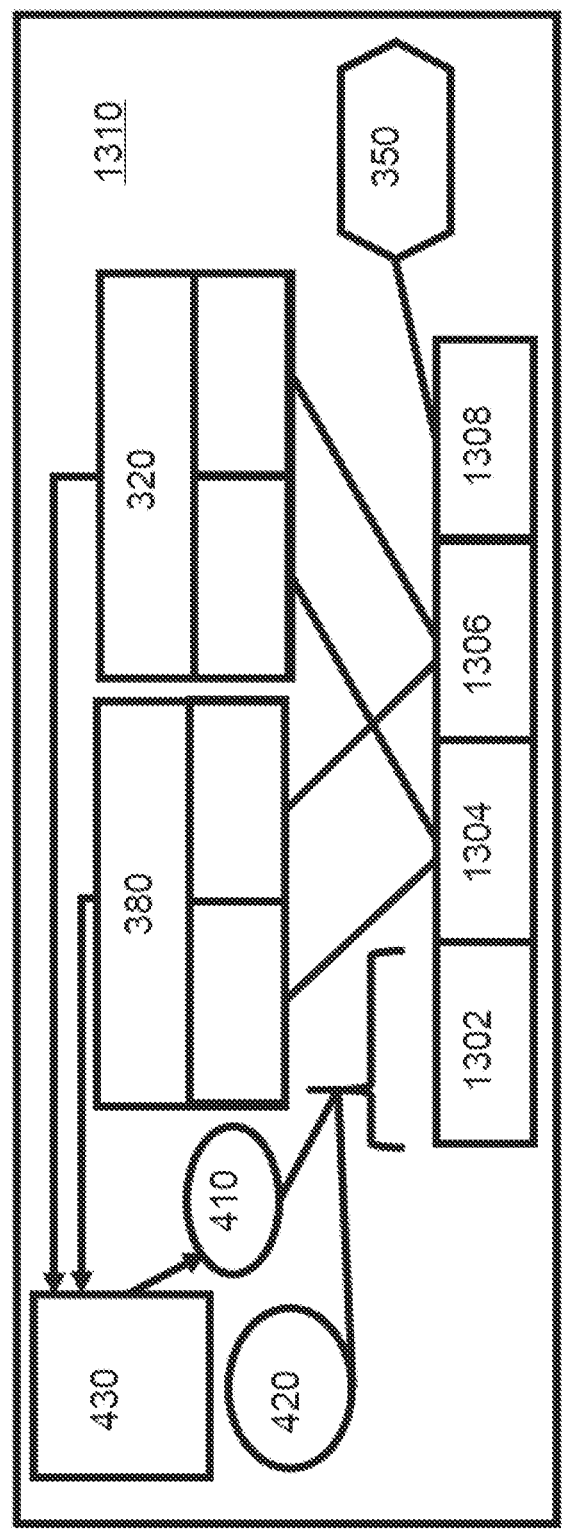
FIG. 5 shows server 1310 from FIG. 4 after HA failover from the failure of server 1360.

FIG. 5 shows server 1310 after HA failover from the failure of server 1360.

If the active cores (1364 and 1366) for VNF 330 on server 1360 (not shown here) fail causing an HA failover, then the DRO engine 410 seeing the change of status in VNF metadata 430 will upgrade the status of the standby cores 380 to active and will move them to dedicated cores if available. The extra dedicated cores may come from unused cores that are in a low power state. In a larger server with many cores, it could be that this high priority Dedicated Class workload may push a lower priority Dedicated Class workload having a dedicated core down to a Shared Class status to make cores available for this high priority workload.

However, in the situation shown in FIG. 4 and FIG. 5, the failover workloads will need to be handled within single shared core 1302 or (as shown in FIG. 5) doubled up with the Dedicated Class workloads already on dedicated cores 1304 and 1306 as server 1310 with only four cores does not have unused cores or a set of lower priority workloads on other CPU cores in the Dedicated Class. Thus, after failover, the throughput of VNF 330 now handled as failover VNF 380 will be degraded but there will be no gap in availability. One of skill in the art can assess whether it is an appropriate tradeoff for a particular application case to use four-core servers and tolerate slower processing during a failover or spend more for an eight-core server that will normally have dedicated cores that are largely idle.

Returning to FIG. 4, the DRO engine 460 will see from the metadata that failover VNF 370 requests two cores for use as the standby cores for HA failover for VNF 320 which is active on Server 1310. The DRO engine 460 will not give these two standby cores for failover VNF 370 dedicated cores but will add them to the workloads for the shared core or cores. In this case, the inactive workloads from failover VNF 370 will be added to the single shared core 1362. If the active cores for VNF 320 on server 1310 fail causing an HA failover, then the DRO engine 460 will upgrade the status of the standby cores 370 to active and will move them to dedicated cores if possible. But as noted above, with a four-core server, the now active failover vCPUs will need to be handled without their own dedicated cores.

Thus, after failover, the throughput of VNF 320 now handled as failover VNF 370 will be degraded but there will be no gap in availability.

As noted below, when there are many HA VNFs implemented on one or more large servers, the savings (from reading the metadata to assign the HA standby vCPU cores to shared cores rather than assigning dedicated cores to stand idle) grows as the number of HA workloads and the numbers of cores per HA workload increase.

As a further optimization step, the DRO engine can apply additional tuning to these HA standby workloads which are on dedicated cores (such as in FIG. 3) to decrease the scheduling priority and/or CPU quota used by the Linux process scheduler. This further reduces the amount of processing power allocated to these HA standby workloads while they are in standby mode.

Table A.

Table A looks at a number of situations (A through J). In each row, there is a number of HA VNFs and a number of CPU cores per HA VNF. For illustrative purposes, the table assumes that all HA VNFs within a particular situation have the same number of cores per VNF although this is not a requirement for using the teachings of the present disclosure.

As described in connection with FIG. 3, under the prior art, for each HA VNF, there is a full duplication of the CPU cores in order to meet the HA standard. Thus, as discussed in connection with FIG. 3, a system with two HA VNFs implemented under the prior art that each required two dedicated CPU cores would need a minimum of total of twelve CPU cores which would mean requiring two servers with a minimum of six cores. The number twelve comes from: four active cores; four cores in standby; and one shared core for management workloads on each server and one dedicated CPU for each fast-path on each server.

Using the DRO engine and the teachings of the present disclosure, there is not a full duplication of the standby cores as these standby cores are shared and also handle the management functions. Thus rather than needing a total of at least twelve cores to support two HA VNFs that use two cores each, only eight cores are needed as set forth in the discussion of FIG. 4. The eight cores would be two dedicated cores for active cores for each two-core VNF. Each server would have a core for fast-path data. That is six dedicated cores between the two servers (1310 and 1360). Each server (1310 and 1360) would also have a fourth core to be the shared core. This shared core (1302 and 1362) handles the initially idle standby cores for the HA VNF and the OS workload too.

Row B summarizes what was discussed above with respect to FIG. 3 and FIG. 4. A careful review of Table A indicates that the benefits grow with an expansion of the number of VNFs and the number of cores per VNF.

Row J assumes not just two active VNFs but 20 active VNFs that use three cores each. Under the prior art, this would require 60 dedicated active cores between the two servers and another 60 dedicated standby cores between the two servers. Additionally, there would be a need for a dedicated core to handle the fast-path workload and at least one shared core for management workloads. That would mean each of the two servers would need 62 cores to service this set of VNFs.

In stark contrast, using the teachings of the present disclosure, each server would need only 32 cores. This would be 30 dedicated cores for the 10 active VNFs of three cores each on each server. Each server would also need one dedicated core for the fast-path workload and one core for Shared Class workloads including the 10 inactive VNFs for the HA failover. Purchasing two servers with the capacity to support 32 cores is a sizable savings over having to purchase two servers with the capacity to support 62 cores.

TABLE A

| Situation | Number of HA VNFs | Number of cores per HA VNF | Prior Art CPU Requirements for each Server (includes 1 shared core + 1 fast-path core) | Per Server CPU requirements when using DRO (includes 1 shared core + 1 fast-path core) |
|---|---|---|---|---|
| A | 2 | 1 | 4 | 3 |
| B | 2 | 2 | 6 | 4 |
| C | 2 | 3 | 8 | 5 |
| D | 2 | 4 | 10 | 6 |
| E | 2 | 5 | 12 | 7 |
| F | 2 | 6 | 14 | 8 |
| G | 2 | 7 | 16 | 9 |
| H | 2 | 8 | 18 | 10 |
| I | 2 | 9 | 20 | 11 |
| J | 20 | 3 | 62 | 32 |

ALTERNATIVES AND VARIATIONS

Other Use Cases.

This disclosure has provided details for the use of the teachings of this disclosure within the use case of supporting networking and NFV. This use case is an important use of the teachings of the present disclosure but the teachings may be used productively with respect to many other types of real-time or high-performance systems that would also benefit from dynamic resource allocation—audio/video recording and processing systems, data acquisition, and test & measurement tools are just a few examples. Those of skill in the art will recognize that the teachings of the present disclosure could be used in many different use cases that would benefit from dynamic allocation of resources in response to a changing mix of workloads.

Not Limited to Four-Core or Eight-Core System.

The examples set forth above illustrated concepts using an eight-core system or a four-core system. This was simply because these sized systems lent themselves well to illustrating the points to be made when using simple examples. Those of skill in the art will recognize that the teachings of this disclosure are not limited to a four-core or an eight-core system. The ideas could be implemented on a four-core system, a 64-core system, or a system with some other number of CPU cores.

The Cores May be Physical or Virtual.

The current disclosure may be used by those of skill in the art to allocate physical cores or virtual cores.

Allocation of Non-CPU Resources.

This disclosure has provided details for the use of the teachings of this disclosure to adjust the allocation of a particular resource (CPU cores) across a set of workloads. Those of skill in the art will recognize that the teachings of the present disclosure may be used to dynamically allocate other scarce system resources.

For example, in a system where memory (RAM) is a limited resource, one or more critical workloads are identified by signature. These critical workloads are allocated dedicated memory resources by using cgroups memory limits to partition system memory between a shared pool and dedicated pools for each critical workload. In this way the system's limited memory resources are partitioned to guarantee at least a minimum amount of memory for each critical workload.

One-Time Resource Allocation.

While the teachings of the present disclosure support a system that repeatedly assesses the workloads for proper placement in the Dedicated Class or the Shared Class, repeated assessments are not strictly required. One could implement many of the teachings of the present disclosure with an implementation that makes just one assessment of the workloads and makes a permanent allocation to the Dedicated Class or the Shared Class. This may be a suitable solution for some use cases that are fairly stable after completing initiation. The first assessment could be delayed until the compute platform is enabled and the workloads are active so that the system parameters such as CPU utilization per workload are indicative of the workload character.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method for dynamically allocating a fixed number of CPU resources within a compute platform;

the method comprising:

obtaining a first data sample at a first time for a first parameter for a set of workloads running within the compute platform;

obtaining a second data sample at a second time, later than the first time, for the first parameter for the set of workloads;

comparing for each workload within the set of workloads, a value for the first parameter taken at the second time and a value for the first parameter taken at the first time;

based upon a comparison of the value for the first parameter taken at the second time and the value for the first parameter taken at the first time setting a determination for each workload within the set of workloads whether the workload should be in a Dedicated Class of workloads and assigned to a dedicated CPU resource or in a Shared Class of workloads that is handled by a set of at least one shared CPU resource, wherein a shared CPU resource may service more than one workload;

based upon the determination for each workload within the set of workloads, mapping each workload within the Dedicated Class of workloads to have exclusive use of a Dedicated CPU resource and mapping each workload in the shared class of workloads to be handled by the set of at least one shared CPU resource;

obtaining a third data sample at a third time after the second time for a second parameter for the set of workloads running within the compute platform;

obtaining a fourth data sample at a fourth time, later than the third time, for the second parameter for the set of workloads;

comparing for each workload within the set of workloads, a value for the second parameter taken at the fourth time and a value for the second parameter taken at the third time;

based upon a comparison of the value for the second parameter taken at the fourth time and the value for the second parameter taken at the third time setting a determination for each workload within the set of workloads whether the workload should be in the Dedicated Class of workloads and assigned to a dedicated CPU resource or in the Shared Class of workloads that is handled by a set of at least one shared CPU resource, wherein a shared CPU resource may service more than one workload; and based upon the determination for each workload within the set of workloads, mapping each workload within the Dedicated Class of workloads to have exclusive use of a Dedicated CPU resource and mapping each workload in the shared class of workloads to be handled by the set of at least one shared CPU resource.

2. The method of claim 1 wherein after the fourth time, a particular workload is reclassified from the Dedicated Class of workloads to the Shared Class of workloads.

3. The method of claim 1 wherein after the fourth time, a particular workload is reclassified from the Shared Class of workloads to the Dedicated Class of workloads.

4. The method of claim 1 wherein the second parameter is the first parameter.

5. The method of claim 1 wherein the second parameter is not the first parameter.

6. The method of claim 1 further comprising:

setting a determination for each workload at an initial time, before the first time, whether the workload should be in a Dedicated Class of workloads and assigned to a dedicated CPU resource; or in a Shared Class of workloads that is handled by a set of at least one shared CPU resource, wherein a shared CPU resource may service more than one workload; and wherein the determination for each workload made at the initial time is based upon metadata associated with each workload.

7. The method of claim 1 further comprising using metadata for each workload within the set of workloads wherein the metadata determines whether to:

use the existing determination for whether that workload should be:

in the Dedicated Class of workloads and assigned to the dedicated CPU resource; or in the Shared Class of workloads that is handled by the set of at least one shared CPU resource, wherein the shared CPU resource may service more than one workload; or set a new determination based upon metadata for whether that workload should be:

in the Dedicated Class of workloads and assigned to the dedicated CPU resource; or in the Shared Class of workloads that is handled by the set of at least one shared CPU resource, wherein the shared CPU resource may service more than one workload;

setting a determination for each workload within the set of workloads whether the workload should be:

in the Dedicated Class of workloads and assigned to the dedicated CPU resource; or in the Shared Class of workloads that is handled by the set of at least one shared CPU resource, wherein the shared CPU resource may service more than one workload; and based upon the determination for each workload within the set of workloads, mapping each workload within the Dedicated Class of workloads to have exclusive use of the Dedicated CPU resource and mapping each workload in the shared class of workloads to be handled by the set of at least one shared CPU resource.

8. The method of claim 1 wherein:

obtaining the first data sample at a first time for the first parameter for a set of workloads running within the compute platform is performed for less than a larger set of all workloads running within the compute platform; and obtaining the second data sample at the second time, later than the first time, for the first parameter for the set of workloads is performed for less than the larger set of all workloads running within the compute platform, wherein the larger set of all workload includes the set of workloads and a second set of workloads running on the compute platform that have metadata that exempts the second set of workloads from comparing for each workload:

the value for the first parameter taken at the second time; and the value for the first parameter taken at the first time; and wherein for the second set of workloads the metadata will be used to set a determination for whether that workload should be:

in the Dedicated Class of workloads and assigned to the dedicated CPU resource; or in the Shared Class of workloads that is handled by the set of at least one shared CPU resource, wherein the shared CPU resource may service more than one workload.

9. The method of claim 1 wherein at least one dedicated CPU resource is a physical core.

10. The method of claim 1 wherein at least one dedicated CPU resource is a virtual core.

11. The method of claim 1 wherein the first parameter comprises an indication of how much time each workload was executed by a CPU resource in an interval of time between the first time and the second time.

12. The method of claim 1 wherein the first parameter is requested CPU time which comprises an indication of how much time each workload was waiting to be executed by a CPU resource in an interval of time between the first time and the second time added to an indication of how much time each workload was executed by a CPU resource in an interval of time between the first time and the second time.

13. The method of claim 1 wherein the first parameter comprises a number of voluntary context switches to yield execution of a particular workload in an interval of time between the first time and the second time.

14. The method of claim 1 wherein:

X is a value for a number of workloads in the Dedicated Class of workloads to be assigned to a dedicated CPU resource within a current set of dedicated CPU resources;

Y is a value for a number of the current set of dedicated CPU resources within the current set of dedicated CPU resources; and while X is greater than Y, unused CPU resources are converted to dedicated CPU resources until X=Y or a number of unused CPU resources is zero.

15. The method of claim 1 wherein:

X is a value for a number of workloads in the Dedicated Class of workloads to be assigned to a dedicated CPU resource within a current set of dedicated CPU resources;

Y is a value for a number of dedicated CPU resources within the current set of dedicated CPU resources; and while X is greater than Y, workloads within the Dedicated Class of workloads are selected for reclassification as Shared Class workloads until X=Y.

16. The method of claim 15 wherein the workloads within the Dedicated Class of workloads are ranked to form a ranking and low ranking workloads are selected for reclassification as Shared Class workloads until X=Y.

17. The method of claim 16 wherein the ranking of each of the workloads within the Dedicated Class of workloads is based at least in part on metadata for each of the workloads.

18. The method of claim 1 further comprising tuning at least one dedicated CPU resource to have characteristics different from the set of at least one shared CPU resource.

19. The method of claim 18 where the dedicated CPU resource differs from the shared CPU resource in that the dedicated CPU resource is not available to respond to a subset of interrupts from an operating system.

20. The method of claim 18 where the dedicated CPU resource differs from the shared CPU resource in that the dedicated CPU resource is set to a mode which operates at maximum frequency.

21. The method of claim 18 where the dedicated CPU resource differs from the shared CPU resource in that the dedicated CPU resource is set to a mode which prevents idle states and prevents wait states.

22. A method for dynamically allocating a fixed number of CPU resources within a compute platform;

the method comprising:

obtaining a first data sample at a first time for a first parameter for a set of workloads running within the compute platform;

obtaining a second data sample at a second time, later than the first time, for the first parameter for the set of workloads;

comparing for each workload within the set of workloads, a value for the first parameter taken at the second time and a value for the first parameter taken at the first time;

based upon a comparison of the value for the first parameter taken at the second time and the value for the first parameter taken at the first time setting a determination for each workload within the set of workloads whether the workload should be in a Dedicated Class of workloads and assigned to a dedicated CPU resource or in a Shared Class of workloads that is handled by a set of at least one shared CPU resource, wherein a shared CPU resource may service more than one workload; and based upon the determination for each workload within the set of workloads, mapping each workload within the Dedicated Class of workloads to have exclusive use of a Dedicated CPU resource and mapping each workload in the shared class of workloads to be handled by the set of at least one shared CPU resource.

\* \* \* \* \*